United States Patent [19]

Kleinwaks

[11] 4,279,192

[45] Jul. 21, 1981

[54] ELECTRONIC COMPENSATOR FOR A PNEUMATIC SERVO CONTROLLED LOAD BEARING BELLOWS SYSTEM

[75] Inventor: Jeffrey M. Kleinwaks, Binghamton, N.Y.

[73] Assignee: The Singer Company, Binghamton, N.Y.

[21] Appl. No.: 69,465

[22] Filed: Aug. 24, 1979

[51] Int. Cl.³ .................. F15B 13/16; F15B 11/10
[52] U.S. Cl. ................................ 91/361; 91/433
[58] Field of Search ............... 91/433, 361, 363 R, 91/363 H, 388; 92/34

[56] References Cited

U.S. PATENT DOCUMENTS 3,464,318  9/1969  Thayer et al. ............... 91/363 R
4,164,167  8/1979  Imai et al. .................... 91/433

FOREIGN PATENT DOCUMENTS

41-18410  6/1966  Japan ........................... 91/363 R

Primary Examiner—Paul E. Maslousky
Attorney, Agent, or Firm—Douglas M. Clarkson; J. Dennis Moore; Jeff Rothenberg

[57] ABSTRACT

An electronic compensation circuit for a pneumatic load bearing bellows system closed on position, in which a servo valve provides pressure to the bellows to actuate the top of the bellows to move to a predetermined position in response to a control signal. The compensation circuit (42) cancels at least one load-variable system characteristic which, if not cancelled would cause system instability at system gain levels which are necessary for desired system response. The compensation circuit electronically provides a replacement system characteristic which permits the system to be operated at a gain level substantially higher than the gain level at which the uncompensated system goes unstable.

5 Claims, 9 Drawing Figures

ELECTRONIC COMPENSATOR FOR A PNEUMATIC SERVO CONTROLLED LOAD BEARING BELLOWS SYSTEM

BACKGROUND OF THE INVENTION

1. Field of the Invention

The invention relates to control systems and more particularly relates to a pneumatic servo-controlled bellows actuator system.

2. Brief Description of the Prior Art

The present invention relates to bellows type pneumatic actuator systems. A rough schematic of such a system can be found in FIG. 1 of the drawings. As shown, it includes a pneumatically drivable bellows-type actuator and a servovalve which regulates the pressure of gas in the bellows. The bellows is provided with a position sensing device which has as an output a position signal corresponding to the position of the top surface of the bellows. This position signal is fed to drive electronics where it is compared with a control, or command signal to produce an output signal which corresponds to the difference of the position signal and the command signal. This output signal is the drive signal for the servovalve. Such a system is said to be "closed on position". In such systems the position of the controlled surface may be very precisely controlled.

Actuators of this type find numerous applications. In machining operations, for example, where it is frequently necessary or desirable to controllably move a tool and work piece with respect to one another in a precise manner, a bellows type actuatoring system may be used to provide that movement.

Another, demanding application for the bellows type actuator is in connection with G seats for vehicle simulators. G seats are vehicle seats which have been specially modified to provide controllable flesh pressure and other physiological stimulii to the operator of a vehicle simulator in order to duplicate the sensory cues which the operator would experience in the vehicle being simulated. These sensory cues are created by the motion of one or more surfaces which comprise the seat cushion and backrest of the G seat. These surfaces may be actuated by pneumatic bellows actuators. An example of such a G seat is disclosed in U.S. Pat. No. 3,983,640 entitled "Advanced G Seat for Aircraft Simulation".

Pneumatic bellows type actuators offer several advantages in these applications over other types of actuators, such as hydraulic actuators. Pneumatic actuators are safe, operating at a pressure of the order of 15 psi, and are also clean. They are reasonably maintenance free as well and are relatively low cost items, typically.

However, one problem with the pneumatic bellows actuator is its relatively poor response. That is, the intrinsic capacity for a bellows type actuator driven by a servovalve to quickly respond to a control signal and move to a desired position without overshoot and excessive transient movement is rather limited. In the absence of any feedback at all such systems have typical bandwidths of the order of less than 1 hertz. By closing the loop on pressure (providing pressure feedback) the system bandwidth can be extended to beyond 5 hertz, but this does not allow for accurate position control. By closing the loop on position (providing position feedback) and increasing the system gain, accurate control of position is possible, and bandwidth can be improved to something slightly over one hertz. But if the gain is further increased in an effort to improve responsiveness even more, it is found that such systems closed on position go unstable, that is, they go into self oscillation.

Nonetheless, it is considered desireable in the G seat area to have bandwidths of the order of 5 to 10 hertz. There thus exists a need to improve upon existing pneumatic bellows-type actuator systems closed on position to increase their bandwidth capability, and hence responsiveness.

Attempts have been made toward this end by the construction of electronic circuits which are intended to compensate for system characteristics which cause the aforementioned instabilities at higher gain levels. For example, one recent attempt included electronic feed forward compensation which extended the bandwidth of a pneumatic bellows servosystem to approximately 3 hertz with an 18 pound load. While this represents an advance over prior uncompensated systems it falls short of the aforementioned desired performance. In addition, while the bandwidth of that system for an 18 pound load was of the order of 3 hertz, the bandwidth decreased with increasing loads. In practice, the actual load requirements of such G seat actuators can be considerably higher than 18 pounds. An improvement is clearly needed.

The present invention is such an improvement. It provides electronic compensation for a bellows type pneumatic actuator system which extends the bandwidth of the system response to above 5 hertz. Significantly, it also renders the system bandwidth independent of load so that the system bandwidth remains broad even at the load requirements demanded for G seat operation. This important result represents a significant breakthrough in the area of bellows type pneumatic actuator systems.

SUMMARY OF THE INVENTION

Accordingly, it is an object of the present invention to provide electronic compensation to a bellows type pneumatic actuator system which significantly expands the bandwidth of the system response.

Another object is to provide electronic compensation to such a system in a way that causes the resulting bandwidth of the system response to be substantially invariable with changing loads.

These and other objects which will appear hereinafter are accomplished by providing, in a bellows type pneumatic actuator system of the type described above, means for monitoring the bellows and generating a load signal representative of the load on the surface of the bellows, and a compensation circuit responsive to that load signal which cancels load dependent system characteristics which causes the system to go unstable at high levels of system gain.

BRIEF DESCRIPTION OF THE DRAWINGS

These and other features of the present invention will be more clearly understood from a consideration of the following description taken in connection with the accompanying drawings in which:

FIG. 7 is a schematic diagram of a circuit constructed according to the block diagram in FIG. 5; while

DETAILED DESCRIPTION OF THE PREFERRED EMBODIMENT

As was mentioned above, FIG. 1 shows a bellows type pneumatic actuator system closed on position. It includes a bellows assembly 10 which comprises bottom support surface 12 on which rests a bellows 14. This bellows 14 is completely sealed except for a port 20 through which gas may be pumped and exhausted. A load bearing surface 22 rests on top of the bellows 14. This surface 22 moves in a direction indicated by arrow 36, which can be denominated the Y direction.

Figure 1:
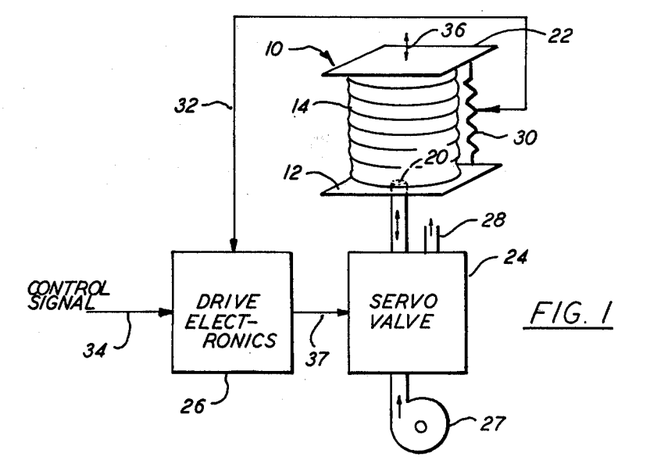
FIG. 1 is a schematic diagram of a bellows type pneumatic actuator system closed on position.

Gas pressure in the bellows 14 is regulated by a standard servo valve 24 which is connected to the port 20 and controlled by a drive signal provided by the drive electronics 26. In response to the drive signal, the servo valve 24 either provides gas pressure from a pump 27 or exhausts gas from the cell through an exhaust port 28. A standard position sensing device 30, such as a linear variable differential transformer, is mounted in conjunction with the bellows assembly 10 to provide a signal to line 32 representative of the relative position of the upper, load bearing surface 22. Line 32 connects to one of the inputs of the drive electronics 26. The other input of the drive electronics is connected to a line 34 which carries a control signal representative of a desired position of the top surface 22.

The drive electronics 26 comprises a differential amplifier which compares the position signal with the control signal and provides a difference signal as an output. This output signal, the drive signal, is applied by way of line 37 to the servovalve 24 which regulates the pressure in the bellows 14 in response thereto.

Figure 2:
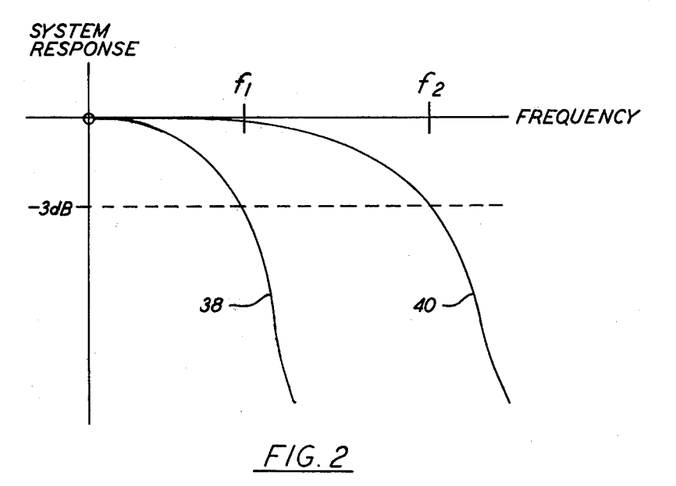
FIG. 2 is a plot of the system response of two actuator systems with frequency.

FIG. 2 shows a plot of the magnitude of the Y axis excursion of a typical bellows-type actuator in response to a control signal of fixed magnitude, plotted against the frequency of that control signal. Two curves are shown. The first 38 indicates the system response for a system like that shown in FIG. 1. The curve shows that the value of the system response drops 3 dB below its maximum value at a frequency denominated $f_1$. As mentioned above, $f_1$ is typically 1 hertz or less. The second curve 40 in FIG. 2 represents the desired system response, $f_2$, being approximately 5 to 10 hertz.

Figure 3:
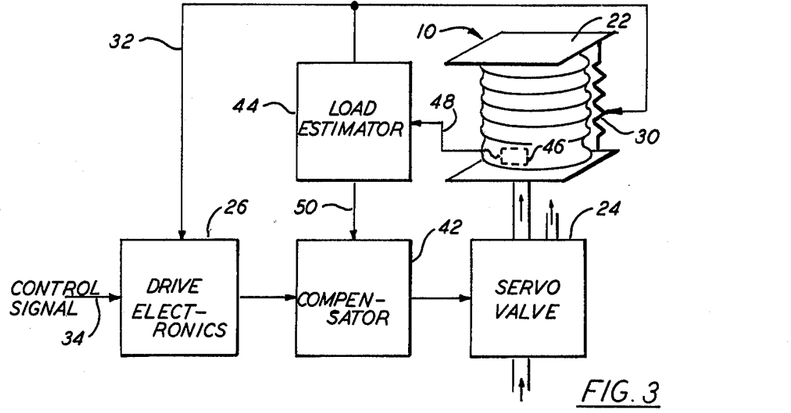
FIG. 3 is a schematic diagram of a bellows type pneumatic actuator system closed on position modified in accordance with the present invention.

FIG. 3 is a block diagram which shows a bellows-type pneumatic actuator system which has been modified in accordance with the present invention. A compensator circuit 42 has been added in the drive signal path, as shown. The compensator circuit 42 also receives an input from a load estimator 44. The load estimator 44 is a circuit which receives signals from the position sensing device 30 by way of line 32, and from a pressure transducer 46, of known construction, by way of line 48. The pressure transducer 46 provides a pressure signal representative of the pressure within the bellows 10.

The load estimator circuit 44 acts on both input signals and provides as an output a signal representative of the load on the bellows assembly 10. This signal is fed to the compensator circuit 42 by way of line 50.

The compensator circuit 42 receives the load signal and automatically adjusts itself to modify the drive signal in a manner which varies as the load varies. The compensator circuit 42 thereby "adapts" to a dynamic load condition and compensates the system so as to cancel undesirable system characteristics which change with load.

Figure 4:
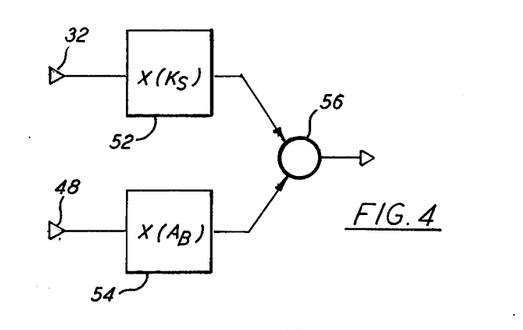
FIG. 4 is a block diagram of the load estimator shown in FIG. 3.
Figure 5:
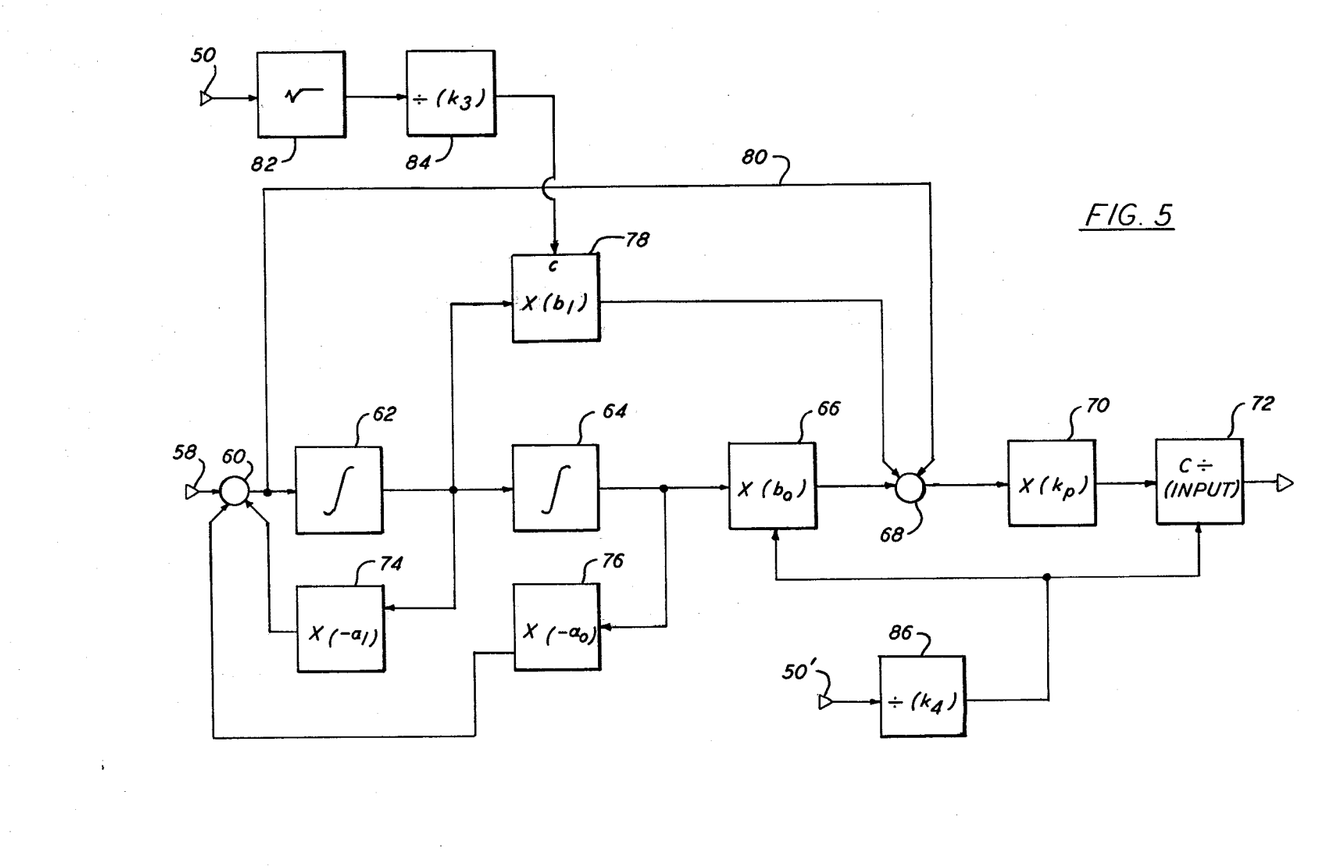
FIG. 5 is a block diagram of the compensator shown in FIG. 3.

The load estimator circuit 44 is presented in block diagram form in FIG. 4 while the compensator circuit 42 is presented in block diagram form in FIG. 5. Both of these circuits are made up of a number of blocks which represent subcircuits of well known construction. These subcircuits operate on signals in a manner which can be described by way of a mathematical function. In these block diagrams the mathematical function is indicated by a symbol within the respective block. For example, block 52 in FIG. 4 shows an X which denotes a multiplication function, block 82 in FIG. 5 shows a square root function and block 84 shows a dividing function. The parenthetical figures which appear in a number of the blocks in these two figures represent multiplicative factors. For example the output of block 52 in FIG. 4 will have a value corresponding to the value of the input to block 52 times $K_S$. The output of block 84 in FIG. 5 will have a value corresponding to the inverse of the input (the division sign indicating that the input is divided into one) multiplied by the factor $K_3$.

Blocks 66, 72, and 78, which show two inputs, represent subcircuits in which the multiplicitive factor is a variable controlled by the signal on a control port, designated by a "C" in those blocks, as shown. For example, the values of the output signal of block 84 has a magnitude equal to a variable, $b_1$, which will be described below, and this is the multiplicitive factor for block 78.

Note that the input of block 72 is connected to the output of block 86, while the control port forms the input in the main signal path. The reason for this is that the value of the output signal of block 86 has a magnitude equal to a variable quantity, $b_0$, which will be described below, and it is desired that the last block multiply the signal in the main signal path by $(1/b_0)$. It is evident from a consideration of the above principles that this configuration effects this. Other configurations to effect this function are also possible. For example, block 72 could be made a multiplier, and a divider could be put in the signal path between block 86 and 72. The preferred embodiment is considered to contain the most efficient such configuration.

Blocks such as 62 and 82 which contain no parenthetical figure simply perform the indicated operation on their respective signals with no corresponding gain, or in other words, a gain of one. The other mathematical functions performed by the blocks in these figures are time integration (blocks 62 and 64), and square root (block 82) which means that the output corresponds to the square root of the value of the input. Circles, such as 56, 60, and 68 represent summation points. The arrows indicate the direction of signal flow.

Turning to FIG. 4, multiplier 52 receives the position signal from line 32 and provides an output signal the value of which corresponds to the product of the value of the position signal and the constant $K_S$. Multiplier 54 receives the pressure signal from line 48 and provides an output signal having a value corresponding to the product of the value of the pressure signal and the constant $A_B$. These two signals are summed at summer 56.

The output of the summer 56 is the load signal. $K_S$ is selected to correspond to the spring constant associated with the bellows 14 (FIG. 1) while the value $A_B$ corresponds to the area of the load bearing surface 22 on which the gas in the bellows 14 pushes. The output of the summer 56 thus represents the product of the bellows displacement in the Y direction and the spring constant, plus the product of the pressure in the cell and the area of the cell in contact with the top surface 22. This corresponds to the sum of the two major force components associated with the bellows 10, namely, the spring force and the pneumatic force. The summer 56 output, L, therefore corresponds to the load on the bellows assembly 10.

FIG. 5 is a block diagram of the compensator circuit 42. A first input port 58 receives the output of the drive electronics, while second and third input ports 50, 50', receive the output of the load estimator. The main circuit path comprises a summer 60, two integrators 62 and 64, a multiplier 66, a second adder 68, a second multiplier 70 and finally, a first divider 72, all serially connected one to the other. Four "loop" branches are provided in the circuit as well. The output of the first integrator 62 is routed back to the first summer 60 through a third multiplier 74. The output of the second integrator is also routed back to the first summer 60 through a fourth multiplier 76. The output of the first integrator 62 is fed forward to the second summer 68 to a fifth multiplier 78. Finally, the output of the first summer 60 is fed forward to the second summer 68 along line 80, as shown.

As previously mentioned, the load signal from summer 56 and the load estimator circuit is fed to two ports 50, 50', in the compensator. The second port 50 is connected to the input of "square rooter" 82 the output of which is connected to a second divider 84, the output of which is in turn connected to one input of the fifth multiplier 78. The third input port 50' is connected to the input of a third divider 86 which has its output connected to inputs of both the first multiplier 66 and the first divider 72.

The constant $K_3$ is a number which is related to deriveable parameters of the actuator system. $K_3 = 2\zeta\sqrt{K_s}\sqrt{g}$, where $\zeta$ = the damping ratio of the bellows, $K_s$ = the spring constant of the bellows and g = the acceleration of gravity. $K_4 = g(K_s + A_B^2 K_1)$, where $K_1$ = the compressibility of the gas which is used in the bellows.

The factors $b_0$ and $b_1$ are variable factors which depend directly on the load signal and the constants $K_4$ and $K_3$, respectively. The values $a_0$ and $a_1$ are numerical constants the selection of which, to a certain extent, depends on the preference of the practitioner of this invention. Considerations in selecting these values will be discussed below. $K_p$ is a variable gain factor.

FIG's 6 and 7 are schematic diagrams of circuits constructed according to the block diagram schematics of FIG. 4 and FIG. 5, respectively.

Figure 6:
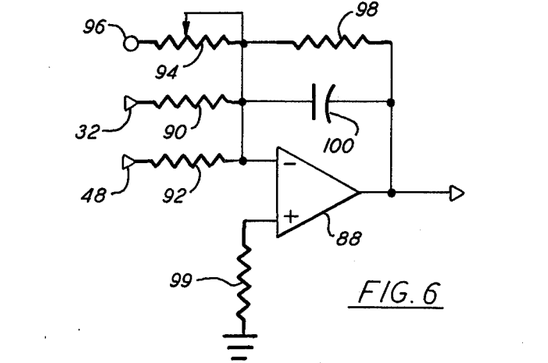
FIG. 6 is a schematic diagram of a circuit constructed according to the block diagram in FIG. 4.

Turning to FIG. 6, it will be noted that the respective multiplicative function and the summing function are effected integrally. $K_s$ is determined by the ratio of resistor 98 to resistor 90, while the value $A_B$ is set by the ratio of resistor 98 to resistor 92.

The potentiometer 94 is connected to a negative DC voltage source at 96. Its purpose is to allow the cancellation of any offset intrinsic to either or both the pressure and position transducers. Resistor 99 is simply a bias resistor. The capacitor 100 in the feedback path performs the function of filtering out higher order signal values corresponding primarily to the time rate of change of the bellows position. It was determined that these higher order effects would be unnecessary and, in fact, undesirable. The time constant for the R98 and C100 branch was selected to be approximately 0.2 seconds.

Figure 7:
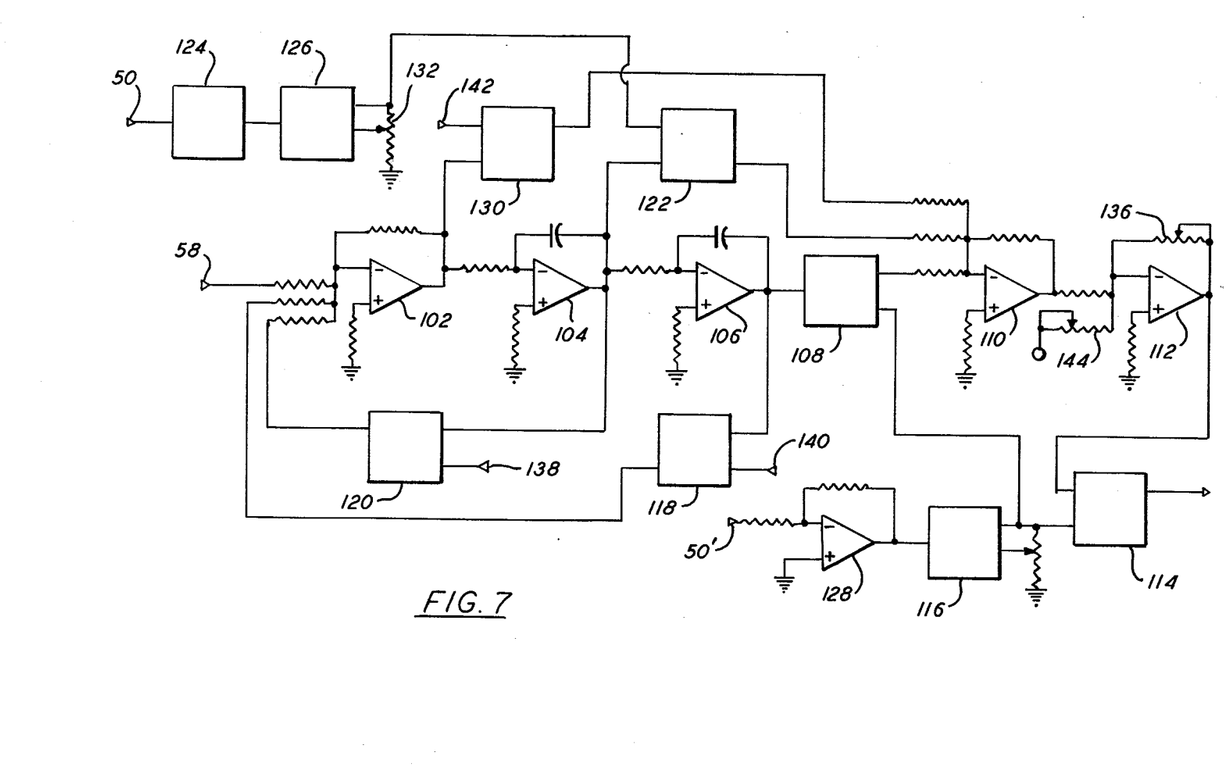

Turning to FIG. 7, two types of active components are used in the construction of this, the preferred embodiment of the compensator. The square boxes represent precision multipliers such as the AD534, manufactured by Analog Devices, Inc., Norwood, Mass. 02062. These devices can be made to perform a variety of mathematical functions on electrical signals according to the appropriate selection of components and input and output connections specified by the manufacturer for that function. Such devices can act as multipliers, squarers, dividers, and square rooters.

The other active component is an operational amplifier. For best performance, a device should be selected which has a low offset voltage, for example an LF356 manufactured by National Semiconductor Corp., Santa Clara, Calif. 95051.

The 1:1 correspondence of the circuit diagram of FIG. 7 to the block diagram of FIG. 5 is apparent from a visual comparison of the two. The first operational amplifier 102 and its associated resistors performs the function of the first summer (60 in FIG. 5). There follows in the main signal path operational amplifiers 104 and 106 configured as integrators, as shown (62 and 64 in FIG. 5). There follows multiplier 108, summer 110, multiplier 112, and finally divider 114 (68, 70 and 72, respectively, in FIG. 5). Multipliers 118, 120 and 122 (76, 74 and 78, respectively, in FIG. 5) are arranged as shown, as are square rooter 124 and dividers 126 and 116 (82, 84 and 86 respectively, in FIG. 5). The remaining major circuit elements are an inverter 128 and an amplifier 130, as shown. The inverter 128 is necessary in this configuration for the polarity of the signal to be correct, given the circuit elements which are used. In fact, when constructing a circuit according to the present invention, the practitioner should keep the various changes in polarity in mind which occur in the various circuit elements. Depending upon the particular elements selected, polarity reversal may be required at other places in the circuit as well.

The multiplier 130 multiplies by a factor of approximately ten. This element is included because there are magnitude changes in the signals at various points in the circuit. In order for the summation at summer 110 to be of signals all having the same magnitude, it is necessary that a ten times multiplier be included as shown. Again, it is to be noted that order of magnitude changes may occur at various places in the circuit as a result of the particular components used. The relative orders of magnitudes of the various signal paths should be made to match where they come together. This is well within the purview of the ordinary practitioner of the art.

Potentiometer 132 sets the value of $K_3$ for multiplier 126. Similarly, potentiometer 144 sets the value of $K_4$ for multiplier 116, and potentiometer 136 sets the value of $K_p$. Finally, the values $a_1$ and $a_0$ are set according to the voltages applied to ports 138 and 140, respectively. The voltage on port 142 of multiplier 130 is set so that multiplier 130 multiplies by ten, as described above.

Potentiometer 144 serves a function similar to that of potentiometer 94 in FIG. 6; it is connected to a negative voltage source and its adjustment allows any cumulative offset effect from the various offsets of all of the active elements in the circuit to be cancelled.

The actual selection of the various values of resistors and capacitors follows from the determination of the given system parameters, as discussed above. The most important thing to keep in mind is that of consistency; for example, if one selects inches, seconds and kilograms as the units for the expression of a particular value, those same units should be used for the calculation of every other value which includes such types of units. For example, in calculating $K_4$ for the actuator system for which the preferred embodiment was originally constructed, it was determined that $K_s = 24.7$ lbs./inch, $A_B = 11.96$ inch$^2$, and $K_1 = 0.687$ lbs/inch$^5$. The value of g, in these units, is 386 inch/sec$^2$. The resulting computed value, according to the relationship set forth above, is equal to 12,705.8 lbs/sec$^2$. The gain (or multiplier factor) for multiplier block 116 in FIG. 7 is thus simply set to approximately 47,466. Having adopted the units inches, pounds and seconds, the other constants must be calculated accordingly, e.g., $K_3$, which equals $2\zeta\sqrt{K_s}\sqrt{g}$ is equal to 58.59 lbs$^{\frac{1}{2}}$ sec, where $\zeta$ is 0.3, which was the case for the actuator system for which the preferred embodiment was originally constructed. It can be readily understood that the particular values of $K_3$ and $K_4$ will be, in general, different for any particular system, as compared to another, depending upon the particular system parameters involved in calculating the constants.

The values $b_0$ and $b_1$ are, as mentioned above, dependent upon $K_4$ and $K_3$, respectively, and need no independent calculation. In fact, $b_0 = K_4/L$ and $b_1 = K_3/\sqrt{L}$, as is evident from an inspection of the circuit branches leading from port 50 and 50' in FIG. 5.

The remaining values are those of $a_0$ and $a_1$. For the preferred embodiment, these values are 7,500 seconds$^{-2}$ and 175 seconds$^{-1}$ respectively. Unlike the values of $K_3$ and $K_4$, which must conform closely to the calculated values as explained above, a certain degree of latitude may be shown in chosing the values of $a_0$ and $a_1$. The reason for this is as follows.

Figure 8:
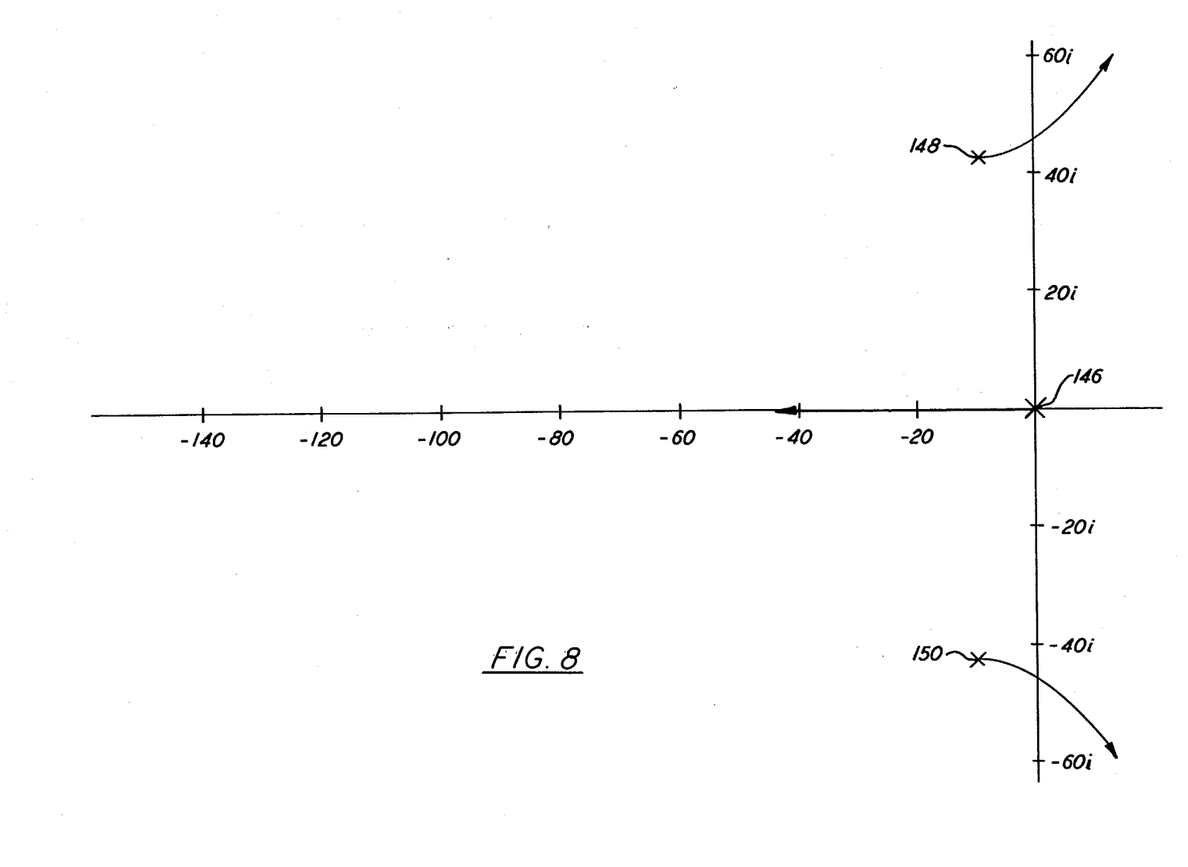
FIG. 8 is a frequency domain plot of the poles of the system shown in FIG. 1.

Plotting in the frequency domain the characteristic system poles relatively near the imaginery axis of a bellows-type actuator system closed on position yields a plot like that shown in FIG. 8. The "X's" 146, 148, 150, represent the open loop (zero feedback gain) pole positions, while the arrows show the direction of migration of the closed loop poles with increases in gain. As can be seen, the non-real-axis poles 148, 150, cross the imaginary axis at relatively low levels of gain. That, as is known in the art, represents the system going unstable.

Figure 9:
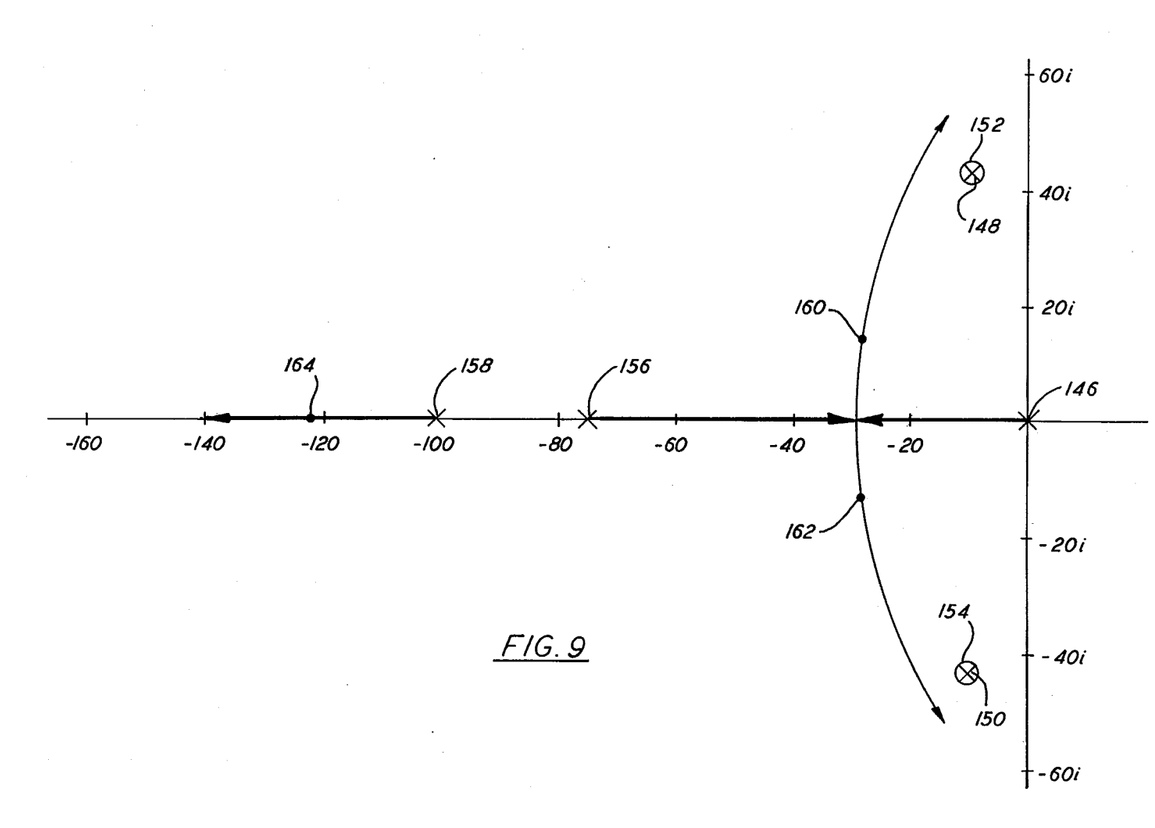
FIG. 9 is a frequency domain plot of the poles and zeroes of the system shown in FIG. 3.

FIG. 9 shows a plot of the zeros and poles for a bellows-type actuator system which has been compensated by the application of the present invention. To understand the meaning of this plot, it is useful to know the transfer function in the frequency domain of the compensator circuit 42. That transfer function is as follows:

$$G_c(s) = \left(\frac{K_P}{b_o}\right)\left(\frac{S^2 + b_1 S + b_0}{S^2 + a_1 S + a_0}\right).$$

As is known in the art, the solution of the numerator of the right hand portion of the expression on the right hand of the above equation yields a pair of "zeros". When $b_1$ and $b_0$ are selected as indicated above, these zeros coincide with the poles of the actuator system, completely cancelling them, no matter what the load. This is represented in FIG. 9 by the circles 152, 154 over the non-real-axis poles 148, 150, as shown.

The denominator of the right hand portion of the right hand side of the above equation represents two additional poles which are added to the system. They are shown in FIG. 9 (156, 158). Note also the arrows associated with each of the remaining, uncancelled poles 146, 156, 158. These arrows correspond to the migration paths of these poles as the system gain is increased from zero. As can be seen, the pole on the far left hand on the real axis 158 travels farther to the left as a result of an increase in gain, while the pole near the imaginary axis 146 and the remaining real axis pole 156 migrate together and "break away" from the real axis at a point corresponding to approximately −28 on the real axis, as shown. If the locations of the uncancelled poles are not exactly those shown in FIG. 9, the migration paths for each of these poles will be somewhat different, but only so much so as the original pole locations are different. The pole positions 146, 156, 158, shown in FIG. 9, represent the open loop pole positions for the preferred embodiment, i.e., for a compensator circuit constructed according to the present invention in which $a_0$ equals 7,500 seconds$^{-2}$ and $a_1$ equals 175 seconds$^{-1}$. The locations represented by dots 160, 162, 164 are the locations these poles occupy when the system gain is set to its final, operating state value. The system response is determined primarily by these final, steady state pole locations, which are considered optimal. However, the practitioner of the present invention, by selecting different values for $a_0$ and $a_1$, may tailor the circuit according to his particular needs and/or desires. The important thing is that the objectionable non-real axis poles are exactly and completely cancelled so that more desirable poles may be introduced in their place.

Finally, the left-most term in the expression in the right hand of the above-equation should be explained. The term $K_p$ has been explained above and represents simply an overall system gain factor. The $b_0$ in the denominator is a cancelling factor for the constant in the numerator of the right hand factor. It will be recalled that $b_0$ is a term which varies with load. In the absence of the $b_0$ term in the denominator of the left hand term, the overall system gain would vary as load varies, because of the existence of the $b_0$ term in the right hand factor. Thus, the left hand factor $b_0$ term insures that the gain will remain constant with load, as desired.

Other circuits having this same transfer function are conceivable. Well known techniques exist in the control system and electronics art for the construction of circuits having desired system transfer functions. It is believed that the circuit contained herein is the optimal implementation of such a transfer function and is therefore preferred. However, it is intended that all such circuits which have frequency domain transfer functions corresponding to that indicated above fall within the scope of the present invention.

What is claimed is:

1. In a bellows-type actuator system having a load moving surface, a bellows associated with said surface, a servo valve for supplying gas to said bellows in response to a drive signal applied thereto, position sensing means associated with said surface for sensing the relative position of said surface and providing a position signal representative thereof, control means for supplying a control signal representative of a desired surface position, a drive circuit including comparing means for comparing said control signal and said position signal and producing a resultant drive signal proportional to their difference, and said drive circuit also including amplifier means for amplifying said drive signal by a predetermined gain factor for driving said servo valve, an improvement comprising:

(a) monitor means for determining the load on said surface and providing a load signal representative thereof; and
(b) compensation means responsive to said load signal for compensating said system so as to cancel a load-variable system characteristic which cause system instabilities.

2. The apparatus of claim 1 wherein said monitor means comprises:

(a) pressure sensing means associated with said bellows for sensing the pressure of said bellows and providing a pressure signal representative thereof; and
(b) load circuit means responsive to said position signal and said pressure signal for generating said load signal such that the magnitude of said load signal bears the following relationship to the magnitudes of said pressure signal and said position signal:

$$L = A_B P - K_S Y$$

where:
 $L$ = magnitude of said load signal,
 $A_B$ = area of said bellows in contact with said surface,
 $P$ = magnitude of said pressure signal,
 $K_S$ = spring constant of said bellows, and
 $Y$ = said relative position of said surface.

3. The apparatus of claim 2 wherein the predetermined gain factor is controllably variable, and load-variable system characteristic comprises at least one system response characteristic which characteristic causes system instability when said gain factor is increased above a first predetermined value, and wherein said compensation means comprises cancelling circuit means for electronically cancelling said system response characteristic and providing a replacement response characteristic which permits said system to be operated at a second predetermined value of gain substantially higher than said first predetermined value such that the responsiveness of said load moving surface to said control signal is improved by the action of said compensation means on said drive signal.

4. The apparatus of claim 3 wherein said load circuit means comprises:

(a) first multiplier means for amplifying said position signal by an amount corresponding to the spring constant of said pneumatic cell to produce a spring force signal;
(b) second multiplier means for amplifying said pressure signal by an amount corresponding to the area of said surface to produce a pneumatic force signal; and
(c) summing means for combining said spring forces signal and said pneumatic force signal to produce a load signal corresponding to the load on said bellows.

5. The apparatus of claim 1 wherein said compensation means comprises:

(a) square root means responsive to said load signal for providing a signal having a value corresponding to the square root of said load signal;
(b) divider means responsive to said square root signal for providing a first load dependent signal having a value corresponding to the mathematical inverse of the value of said square root signal;
(c) divider means responsive to said load signal for providing a second load dependent signal having a value corresponding to the mathematical inverse of the value of said load signal;
(d) first summing means for summing the signals at a plurality of inputs thereof and providing as an output a signal corresponding to their sum, having an input connected to the output of said comparing means;
(e) first integration means for providing as an output a signal corresponding to the integral of the value of an input signal applied thereto, having its input connected to the output of said first summing means;
(f) second integration means for providing as an output a signal having a value corresponding to the integral of an input signal applied thereto, having its input connected to the output of said first integration means;
(g) first multiplier means responsive to said second load dependent signal for providing an output signal having a value corresponding to the product of the value of an input signal applied thereto and the value of said second load dependent signal, having its input connected to the output of said second integration means;
(h) second summing means for summing the signals at a plurality of inputs thereof and providing an output signal corresponding to their sum, having an input connected to the output of said first multiplier means;
(i) divider means for providing a signal having a value corresponding to the mathematical inverse of the value of an input signal applied thereto, having its input connected to the output of said second summing means through a fifth multiplier means for producing an output signal for driving said servo valve;
(j) second multiplier means responsive to said first load dependent signal for providing an output signal having a value corresponding to the product of the value of an input signal applied thereto and the value of said first load dependent signal, having its input connected to the output of said first integration means and its output connected to an input of said second summing means;
(k) third multiplier means for providing an output signal having a value corresponding to the product of the value of an input signal applied thereto and a predetermined first constant value, having its input connected to the output of said first integration means and its output connected to an input of said first summing means;
(l) fourth multiplier means for providing an output signal having a value corresponding to the product of the value of an input signal applied thereto and a second predetermined constant, having its input connected to the output of said second integration means and its output connected to the remaining input of said first summing means; and (m) conductor means connected between the output of said first summing means and the remaining input of said second summing means, whereby the values of $K_3$, $K_4$, said first and said second predetermined constants are selected such that the system characteristics of said compensation means completely cancels said system response characteristic and provides said replacement response characteristic when said system is operated at a predetermined desired overall gain.

* * * * *